(12) United States Patent
Leppaekangas et al.

(10) Patent No.: US 12,547,917 B2
(45) Date of Patent: Feb. 10, 2026

(54) METHOD FOR ERROR REDUCTION IN A QUANTUM COMPUTER

(71) Applicant: HQS Quantum Simulations GmbH, Karlsruhe (DE)

(72) Inventors: Juha Leppaekangas, Karlsruhe (DE); Michael Marthaler, Karlsruhe (DE); Sebastian Zanker, Karlsruhe (DE)

(73) Assignee: HQS Quantum Simulations GmbH, Karlsruhe (DE)

( * ) Notice: Subject to any disclaimer, the term of this patent is extended or adjusted under 35 U.S.C. 154(b) by 911 days.

(21) Appl. No.: 17/785,652

(22) PCT Filed: Dec. 14, 2020

(86) PCT No.: PCT/DE2020/101061
§ 371 (c)(1),
(2) Date: Jun. 15, 2022

(87) PCT Pub. No.: WO2021/170164
PCT Pub. Date: Sep. 2, 2021

(65) Prior Publication Data
US 2023/0048091 A1   Feb. 16, 2023

(30) Foreign Application Priority Data
Feb. 28, 2020   (DE) .................. 10 2020 105 414.9

(51) Int. Cl.
*G06N 10/20* (2022.01)
*G06F 30/20* (2020.01)
(Continued)

(52) U.S. Cl.
CPC ............. *G06N 10/20* (2022.01); *G06F 30/20* (2020.01); *G06N 10/40* (2022.01); *G06N 10/70* (2022.01)

(58) Field of Classification Search
CPC ........ G06N 10/20; G06N 10/40; G06N 10/70; G06F 30/20; G06F 30/25; G06F 30/27; G06F 30/28
See application file for complete search history.

(56) References Cited

U.S. PATENT DOCUMENTS

2019/0244128 A1 *  8/2019  Choi .................. G06N 10/20

FOREIGN PATENT DOCUMENTS

| DE | 10 2018 119 459 A1 | 2/2020 |
| DE | 10 2019 135 807 A1 | 5/2021 |

OTHER PUBLICATIONS

Kandala, Abhinav, et al. "Error mitigation extends the computational reach of a noisy quantum processor." Nature 567.7749 (2019): 491-495 (Year: 2019).*

(Continued)

*Primary Examiner* — Saif A Alhija
(74) *Attorney, Agent, or Firm* — Collard & Roe, P.C.

(57) ABSTRACT

It is already known that quantum computers can be used to simulate materials and molecules. However, quantum computers are error-prone and exhibit intrinsic noise, which has so far made the real technical application of quantum computers impossible. Approaches are already known from the prior art which, despite the error susceptibility, allow meaningful simulations of quantum mechanical systems to be created, but the errors still exist. Building on this, the invention now makes it possible to reduce the errors and to include the errors as part of the simulation. In addition, the invention makes it possible to inhibit the effect of intrinsic noise. This further improves the technical applicability of quantum computers for simulating materials and molecules.

9 Claims, 3 Drawing Sheets

(51) Int. Cl.
　　　G06N 10/40　　　(2022.01)
　　　G06N 10/70　　　(2022.01)

(56) References Cited

OTHER PUBLICATIONS

Ryabinkin, Ilya G., et al. "Qubit coupled cluster method: a systematic approach to quantum chemistry on a quantum computer." Journal of chemical theory and computation 14.12 (2018): 6317-6326. (Year: 2018).*

Sawaya, Nicolas PD, et al. "Error sensitivity to environmental noise in quantum circuits for chemical state preparation." Journal of chemical theory and computation 12.7 (2016): 3097-3108. (Year: 2016).*

Albash, Tameem, and Daniel A. Lidar. "Decoherence in adiabatic quantum computation." Physical Review A 91.6 (2015): 062320. (Year: 2015).*

Li et al., "Efficient variational quantum simulator incorporating active error minimisation", arXiv: 1611.09301v5 [quant-ph] Jun. 19, 2017 (14 Pages).

McArdle et al., "Error-mitigated digital quantum simulation", arXiv: 1807.024671v5 [quant-ph] May 28, 2019 (17 Pages).

International Search Report in PCT/DE2020/101061, mailed Apr. 16, 2021.

Bela Bauer et al. "Quantum algorithms for quantum chemistry and quantum materials science" Arxiy.org, Cornell University Library, 201 Olin Library Cornell University Ithaca, NY 14853, Jan. 10, 2020 (30 pages).

J Cramer et al. "Repeated quantum error correction on a continuously encoded qubit by real-time feedback" Nature Communications, London, May 1, 2016, p. 11526, Retrieved from the Internet: https://arxiv.org/pdf/1508.01388.pdf (23 pages).

Kelly et al. "Scalable in-situ qubit calibration during repetitive error detection" Arxiy.org, Cornell University Library, 201 Olin Library Cornell University Ithaca, NY 14853, Mar. 9, 2016 (8 pages).

Kanav Setia et al. "Bravyi-Kitaev Superfast simulation of electronic structure on a quantum computer" Arxiy.org, Cornell University Library, 201 Olin Library Cornell University Ithaca, NY 14853, Oct. 10, 2018 (13 pages).

Sebastian Zanker et al. "Analyzing the spectral density of a perturbed analog quantum simulator using Keldysh formalism" Arxiy.org, Cornell University Library, 201 Olin Library Cornell University Ithaca, NY 14853, May 5, 2017 (12 pages).

Kanav Setia et al, "Bravyi-Kitaev Superfast simulation of fermions on a quantum computer," dated Dec. 1, 2017, pp. 1-13 (XP081419918).

* cited by examiner

METHOD FOR ERROR REDUCTION IN A QUANTUM COMPUTER

CROSS REFERENCE TO RELATED APPLICATIONS

This application is the National Stage of PCT/DE2020/101061 filed on Dec. 14, 2020, which claims priority under 35 U.S.C. § 119 of German Application No. 10 2020 105 414.9 filed on Feb. 28, 2020, the disclosure of which is incorporated by reference. The international application under PCT article 21(2) was not published in English.

The present invention relates to a method for simulating a quantum mechanical system using a quantum computer which has a plurality of qubits, first a quantum mechanical model of the quantum mechanical system being mapped onto qubits of the quantum computer and being simulated thereon and, within the context of evaluating the simulation, simulation results being extracted by measurements of the quantum computer.

Such a method is already known from DE 10 2019 135 807 A1. In the known solution, a mapping of the quantum mechanical system, for example a chemical structure, is chosen such that decay of a qubit also leads back to a physically meaningful system state. Although the simulation may deviate from a correct result, at least the system does not fall into an invalid, i.e. impossible, state.

On the basis of such considerations, however, work is in progress to make calculations with quantum computers more reliable. A quantum computer is a technically well-controlled quantum system of which the calculation is based on the use of the laws of quantum mechanics. The basic unit of the quantum computer is the quantum bit, the so-called qubit. Like the well-known classical bit, the qubit can assume the values 0 and 1. The main difference from the classical states is that the quantum memory can be in any superposition of the possible bit strings. It follows that a quantum register of N qubits encodes the information of $2^N$ variables. A sufficiently large and well-functioning quantum computer can be used to solve certain mathematical problems that cannot be solved by classical computers. Such problems also include simulations of other quantum mechanical systems.

However, there are many technical difficulties in building a large quantum computer. The main difficulty is isolating a quantum computer from a noisy environment. Not all noise sources are known and quantifiable as such. These also include non-equilibrium states of hardware materials, impurities generated during the production process, local fluctuations generated between different materials during the production process, and residual thermal excitations.

The effect of noise on the quantum simulation can be characterized by its decoherence rate $\gamma$. This results in a characteristic time $t_{lost}=1/\gamma$, in which the information stored in a qubit is lost. The noise and the corresponding decoherence rate are usually further broken down into two specific parts, with one part leading to qubit decay at the rate $\gamma_{dec}$ and the other part leading to qubit dephasing at the rate $\gamma_{dep}$. Currently, qubit decay dominates noise in superconducting quantum computers, while qubit dephasing occurs in trapped ion quantum computers.

A very promising application of small quantum computers is the simulation of other quantum mechanical systems. In fact, it can be shown that quantum simulation algorithms can be faster than any classical computer, even for a small number of qubits.

Against this background, the problem addressed by the present invention is that of creating a method for simulating a quantum mechanical system which uses the advantages of quantum mechanics for the simulation, but at the same time reduces the error susceptibility of these systems.

This is achieved by a method for simulating a quantum mechanical system according to the features of independent claim 1. Meaningful configurations of such a method can be found in the subsequent dependent claims.

According to the invention, in order to simulate a quantum mechanical system, said system is initially mapped onto the qubits of a quantum computer and then subsequently simulated thereon. Within the context of evaluating this simulation, measurements are finally carried out on the qubits and the simulation results are thereby extracted from the quantum computer. In order to rule out errors as far as possible in this context, known and new methods for error reduction will be used to complement one another, so that the effects thereof lead to the most comprehensive possible reduction in the effect of various noise sources, including the inherent noise of the quantum computer itself.

In particular, three mechanisms are used for this, which are proposed and used in different variants. These are: first, error reduction by means of the skillful choice of a qubit basis; error reduction by means of extrapolation, in which the result of the simulation is measured at error rates of different intensity and the error-free result is determined by means of extrapolation; and temperature control by means of introducing an effective thermostat, with one or more qubits being used to generate an effective temperature in the simulated system. Several of these procedures are combined within the scope of the invention.

First, in the solution according to the invention, the simulation of the quantum mechanical system involves mapping logical states of the qubits onto physical states of the qubits, this mapping being optimized for error reduction.

Here, the error minimization is carried out by optimizing logical qubit angles with respect to physical qubit angles so that the inherent noise ideally drives the system to a solution, but at least to an approximate solution of the problem. If an algorithm is applied that repeatedly accesses the same gates, as is the case with Trotter expansion in quantum simulation, the inherent noise, which can also be described as a kind of friction, always generates a steady or quasi-steady state in the system. Here a situation is to be created in which the quasi-steady state is as close as possible to the ground state of the simulated system. The logical qubits are chosen accordingly.

Specifically, this can be solved by the logical states of the qubits each being mapped onto the physical states of the qubits for arbitrary rotation angles $\varphi$ using a transformation operator $U(\varphi)=\exp(-i\varphi\sigma_y/2)=I\cdot\cos(\varphi/2)-i\sigma_y \sin(\varphi/2)$, where I is the identity matrix and $\sigma_y$ is a Pauli matrix in a space spanned by the states $|0\rangle \equiv (1,0)$ and $|1\rangle \equiv (0,1)$.

Quantum computer providers allow their devices to be accessed with a predefined definition of the state of each qubit. The two states are sometimes referred to as 0 and 1, or in a more physics-inspired notation as ↑ and ↓. The predefined setting for the qubits is referred to as the definition of the physical qubit. However, by superpositions of the states of the physical qubit being created, two new states can be defined, which will be referred to below as the states of a logical qubit. The effect of a quantum computer's inherent noise on logical qubits depends on the choice of logical qubits. The simplest choice is that the states of the simulated qubits, i.e. the logical qubits, are the states of the physical qubits $|0\rangle_{logical}=|0\rangle_{physical}$ $|1\rangle_{logical}=|1\rangle_{physical}$ Accordingly, this can also be inverted to $|0\rangle_{logical}=|1\rangle_{physical}$ $|1\rangle_{logical}=|0\rangle_{physical}$ More generally, any superposition defined by a rotation angle q can be chosen, as shown below:

$|0\rangle_{logical}=\cos(\phi/2)|0\rangle_{physical}+\sin(\phi/2)|1\rangle_{physical}$ $|1\rangle_{logical}=\cos(\phi/2)|1\rangle_{physical}-\sin(\phi/2)|0\rangle_{physical}$ This new basis corresponds to a rotation which is defined by the transformation operator $|0/1\rangle_{logical}=U(\phi)|0/1\rangle_{physical}$, where $U(\phi)=\exp(-i\phi\sigma_y/2)=I\cdot\cos(\phi/2)-i\sigma_y\sin(\phi/2).$ In this case, I is the identity matrix and $\sigma_y$ is a Pauli matrix in a space spanned by the states $|0\rangle \equiv (1,0)$ und $|1\rangle \equiv (0,1)$. These types of single qubit operations are easy to implement on a quantum computer.

The ideal, noise-free time evolution in the simulation space always has the same form. A change in the logical qubit definitions is counteracted by 'opposite' changes in the applied physical gates. However, the noise operators are fixed in the physical space and thus rotate in the simulation space. For example, the physical qubit decay changes to $\sigma^+ \to U(\phi)\sigma^+ U^\dagger(\phi)=\sigma^+\cos^2(\phi/2)-\sigma^-\sin^2(\phi/2)-\sigma_z\cos(\phi/2)\sin(\phi/2)$ In particular, when qubit states are flipped, i.e. $\phi=\pi$ is set, the physical qubit decay $\sigma^+$ is mapped onto the logical qubit excitation $\sigma^-$. Furthermore, the dephasing operator transforms to $\sigma_z \to U(\phi)\sigma_z U^\dagger(\phi)=\sigma_z(\cos^2(\phi/2)-\sin^2(\phi/2))+2\sigma_x\cos(\phi/2)\sin(\phi/2).$ In particular, when qubit states are rotated by $\phi=\pi/2$, the qubit dephasing operator oz rotates to the depolarization operator $\sigma_x$.

In particular, the rotation angle $\phi$ for each qubit can be chosen such that the qubit, due to the inherent noise of the quantum computer, decays into a state which describes a meaningful physical system state of the simulated quantum mechanical system. The same applies to decay, where ideally within the context of mapping the quantum mechanical system onto the qubits of the quantum computer, the mapping is chosen such that each qubit describes a meaningful physical state of the quantum mechanical system at least before or after the decay, but preferably both before and after the decay.

In parallel with the choice of the logical qubit angles, an appropriate choice of the particle basis can drastically reduce the effect of noise. Here a situation is considered in which each physical or logical qubit describes an electronic orbital of the system. The effect of inherent noise on a quantum simulation depends on this choice.

In the representation of the second quantization of the electronic structure of a material, the electronic Hamiltonian is projected onto orthogonal wave functions $\phi(x)$, which form the basis states. These create an electronic Hamiltonian $$H = \sum_{pq} h_{pq} c_p^\dagger c_q + \frac{1}{2}\sum_{pqrs} h_{pqrs} c_p^\dagger c_q^\dagger c_r c_s.$$

In this respect ci is the electron annihilation and $c_i^\dagger$ is the electron creation operator in state i, and the kinetic energy and nuclei interaction coefficients are given by one-electron integrals $$h_{pq} = \int dx \varphi_p^*(x)\left(-\frac{\nabla^2}{2}-\sum_I \frac{Z_I}{|r-R_I|}\right)\varphi_p(x),$$

and the electron-electron Coulomb interaction coefficients are given by two-electron integrals $$h_{pqrs} = \int dx_1 \int dx_{12} \frac{\varphi_p^*(x_1)\varphi_q^*(x_2)\varphi_r(x_2)\varphi_s(x_1)}{|x_1 \to x_2|}.$$

Any orthonormal single particle basis can be used to describe the problem. This corresponds to uniform transformations of second-quantized system operators, $c_i$ and $c_i^\dagger$ An optimal choice helps to find a more accurate solution (with limited memory resources) for studied system properties, such as energy. This choice, along with the logical qubit angles, can also be used to drastically mitigate errors, as described below.

An illustrative example is the approach based on the mean field Hamiltonian and its corrections. Here the electronic Hamiltonian is represented in the mean field basis. This basis is first determined from classical simulations.

$$H = H_1 + H_2$$

$$H_1 = \sum_i \omega_i c_i^\dagger c_i$$

$$H_2 = \sum_{pq} \tilde{t}_{pq} c_p^\dagger c_q + \frac{1}{2}\sum_{pqrs} h_{pqrs} c_p^\dagger c_q^\dagger c_r c_s.$$

Here the system description is divided into two regions. The mean field description is used for the region described by the Hamiltonian $H_1$. As a result, this region is described solely by electronic orbitals. The Hamiltonian $H_1$ is diagonal because the orbitals were chosen that way. The ground state wave function for this part is $$|g\rangle = \Pi_{\omega_i<0} c_i^\dagger |vac\rangle,$$

where $|vac\rangle$ is the vacuum, i.e. the state without particles. It is therefore known that there are orbitals that are probably almost full (those where $\omega_i<0$) and orbitals that are almost empty (those where $\omega_i>0$). In the second region, the system is considered with full interaction and thus the system is described by $H_2$. Electrons can in principle jump back and forth between the two regions and this case will be discussed further below. Here the occupancy can be difficult to predict, but on average good assumptions can often still be found.

It can be optimal to choose individual qubit states in such a way that they correspond to the individual particle states, i.e. that the same occupancy probability is generated on average. In the presence of a physical qubit decay, it can be advantageous to choose logical angles such that the decay drives the quantum simulation, preferably exclusively, toward the mean field solution, i.e. that the decay generates the same occupancy probability that the orbital would have in the exact ground state. In order to achieve this, electronic particle states having positive energies, i.e. empty states, are represented by logical qubits having the rotation angles $\varphi=0$ and electronic states having negative energies, i.e. filled states, are represented by excited states where $\varphi=\pi$. In the worst case of a strong decay-defined solution, a mean field solution then results again. For a state having an occupancy of ½, which can occur in the interaction region, the angle $\varphi=\pi/2$ would be chosen.

The occupancy probabilities in the interactive region described by $H_2$ may also look more complicated. This may result in all sorts of partial occupancies. In order to produce this in a qubit that suffers from decay, the rotation angle must be chosen in the range $0<\varphi<\pi$.

However, the particle basis can also be chosen in another way, in particular by a choice that helps to find a more accurate solution for a part of the system or for an observable region other than energy. Appropriate choices could be localized states near certain regions of the system or individual states of other observed objects. Such states are usually characterized by intense partial filling, even in the mean field solution.

A problem is considered with a few very active, partially filled states, an amount of mostly filled states that are below these states in terms of energy, and an amount of mostly empty states that are above these states in terms of energy. In the presence of physical decay it is then probably optimal to choose mostly empty electronic states which are represented by the angle $\varphi=0$ and mostly filled electronic states which are represented by excited states by $\varphi=\pi$.

The states in the active region are either partially filled or empty. Partial filling can be achieved by choosing the angle $0<\varphi<\pi$. For example, a physical qubit decay down to the ground state having the logical qubit angle $\varphi$ corresponds to electronic occupancy $$\langle n \rangle = \sin^2(\phi/2).$$

A decay-driven partial filling may be advantageous, for example, in a cluster-bath approach when there is interest in the properties of localized states near the cluster. For the self-consistent cluster-bath model of solids, too, one of the main problems is matching the kinetic energies to the boundary between the cluster and bath.

Such a cluster-bath approach can be of particular advantage for the method according to the invention, which is why it should be discussed in more detail. In the cluster-bath approach, the quantum mechanical system to be simulated is divided into a cluster and a bath. Some orbitals are defined as part of the bath and some as part of the cluster. When mapping the orbitals onto qubits, the qubits are first evaluated with regard to the system properties thereof and categorized into high-performance qubits and low-performance qubits. The high-performance qubits are then associated with the orbitals in the cluster, and the low-performance qubits are associated with the orbitals in the bath.

In this model a Hamiltonian is assumed as follows.

$$H = H_C + H_B + H_I$$

$$H_C = \sum_{pq \in cluster} t_{pq} c_p^\dagger c_q + \frac{1}{2} \sum_{pqrs \in cluster} h_{pqrs} c_p^\dagger c_q^\dagger c_r c_s$$

$$H_B = \sum_{i \in bath} \omega_i c_i^\dagger c_i$$

$$H_I = \sum_{p \in cluster, i \in bath} t_{pi} c_p^\dagger c_i + t_{ip} c_i^\dagger c_p$$

The system description is divided into three parts: Cluster $H_C$, which describes fully interacting electrons, a bath $H_B$ of non-interacting electrons, and electron hopping between the two regions $H_I$. The modeling within the cluster is as accurate as possible, while the bath and interaction are accounted for in the mean field approach. This provides the most detailed solvable description of many solids and is the basis of dynamic mean field theory (DMFT).

In the presence of intrinsic bath qubit decay, this noise can be used to drive the system to full solution, i.e. to the ground state. A system of non-interacting electrons is fully characterized by a spectral function. Accordingly, the qubits modeling the bath must have the same spectral function as the electronic system to be simulated. The qubits in the cluster see the following spectral function when effectively coupled to the bath qubits:

$$S_{p \in cluster}^-(\omega) = \sum_{i \in empty\,bath} t_i^2 \frac{\gamma_i/2}{(\gamma_i/2)^2 + (\omega - \omega_i)^2}$$

$$S_{p \in cluster}^+(\omega) = \sum_{i \in filled\,bath} t_i^2 \frac{\gamma_i/2}{(\gamma_i/2)^2 + (\omega + \omega_i)^2}$$

Here $\gamma_j$ is the decay rate of the bath qubit j. One part of the spectral density describes empty states (−) and the other part describes filled states (+) in the bath when they do not interact with the cluster. The angles of the logical qubits with respect to the physical qubits are chosen analogously as above, empty places where $\varphi=0$ and filled places where $\varphi=\pi$. The bath decay then drives the system to its full solution. The spectral function can be optimized by choosing the coupling parameter $t_i$ so that it corresponds to the spectral function of the system to be simulated.

Above it was implicitly assumed that the inherent noise of the cluster qubits is negligible. If this is not the case, the noise of the cluster qubits drives the system to an incorrect solution. However, this error can be mitigated. For this it can be advantageous to use cluster angle $0<\varphi<\pi$ in order to obtain only partially occupied cluster states if there is noise.

In an advantageous further development, the method can be supplemented by the simulation results being extrapolated into a low-noise, preferably noise-free, environment when simulating the quantum mechanical system.

This method reduces the effect of noise by extrapolating the noisy result into a low-noise environment. This concept relies on the ability to effectively increase the decoherence rate. It is assumed that the expectation value of the variable X obtained by the noisy quantum computer can be written as a Taylor series.

$$\langle X \rangle (\gamma) = \langle X \rangle (0) + \sum_{k=1}^{n} a_k \gamma^k$$

Here $\langle X \rangle (0)$ refers to the noise-free result, i.e. $\gamma=0$. The result of a calculation on a quantum computer is $\langle X \rangle (\gamma_0)$, where $\gamma_0$ is the normal decoherence rate.

The simplest estimate for the error-free result is a linear extrapolation. The quantum simulation is carried out in the presence of two noise rates, $\gamma_1$ and $\gamma_0$, and only the expansion of the leading order, n=1, is considered. The leading factor in the linear term has the form $$a_1 = \frac{\langle X \rangle (\gamma) - \langle X \rangle (\gamma_0)}{\gamma_1 - \gamma_0}.$$

Hence $$\langle X \rangle (0) \approx \langle X \rangle (\gamma_0) - a_1 \gamma_0.$$

This linear estimate can be further improved by incorporating corrections of a higher order. For this purpose, the quantum simulation is carried out with a plurality of different decoherence rates $$\epsilon_i = c_i \gamma$$

where i∈[0, 1, 2, ..., n]. A new estimate/extrapolation is obtained by $$\langle X \rangle (0) + \sum_{i=0}^{n} \mu_i \langle X \rangle (\epsilon_i)$$

The coefficients must in this case meet the following conditions for k∈[0, 1, 2, ..., n]

$$\sum_{i=0}^{n} \mu_i = 1, \sum_{i=0}^{n} \mu_i c_i^k = 0, \to \mu_i = \prod_{m \neq i} \frac{c_m}{c_m - c_i}$$

Choosing the coefficients in this way cancels out the nth-order error. The concept of extrapolation can also be extended to the exponential approach.

In order to extrapolate a noise-free state, it must be possible to generate artificial noise of different levels in the quantum computer. A well-known method to achieve this is simply to slow down all computing operations on the quantum computer. This effectively increases the decoherence during a calculation. However, another method should be discussed here.

Changing the speed of operations is difficult to implement and requires detailed control over the quantum computer. One method that is easy to control is the effect of increasing the physical time of a Trotter step $d\tau$.

The effect of physical Trotter time $d\tau$ on the error rate $\gamma$ can be derived via the following derivation. The ideal quantum computer time evolution is defined by the Hamiltonian $H_{QC}(t)$. The coupling to the external noise is described by the Hamiltonian $H_E$. Assuming that $d\tau \ll 1/\gamma$, the time evolution operator over the simulation time dt taking into consideration the physical time dt can be written as $$U_{total}(dt, d\tau) \approx U_{QC}(dt) U_E(d\tau) = V_{WC}(dt)$$
$$\exp[id\tau H_E] = U_{QC}(dt) \exp[idt \times c H_E]$$

In this case, $c = d\tau/dt$, resulting in a relationship between the time steps in the hardware and in the simulated system.

After the factor c is multiplied by the environment Hamiltonian, it can simply be included in the definition of $H_E$, where $$H_E \to c H_E$$

This is what the environment Hamiltonian looks like in the logical space. Now all energies and coupling terms related to the environment are multiplied by c. It follows that the decoherence rate of the logical qubits in the quantum simulation changes as well.

As mentioned above, increasing physical Trotter time $d\tau$ itself can be carried out by simple longer gate control pulses. However, this option may not be possible or available to the user. In this case the Trotter time can be increased by a plurality of equivalent operations within one Trotter step. A simple example is splitting the gate operation $\exp(i\varphi\sigma_z)$ in $\exp(i\varphi\sigma_z/2)\exp(i\varphi\sigma_z/2)$. This would double the physical time required to carry out the entire operation. These changes effectively double the decoherence rate for the simulation, resulting in it being possible for extrapolation to be carried out in a noise-free state.

In a further development of the method, an increase in the decoherence rate can be artificially generated by additional qubits. First, a Trotter step is iteratively carried out and then an excitation exchange is carried out between a bath qubit and an auxiliary qubit with a probability p<<1. The auxiliary qubit is measured and, in the event that the auxiliary qubit was measured in its excited state, it is reset to its ground state. Then finally the Trotter step is started again. This method allows the decoherence times of the qubits to be adjusted and finally the simulation results can also be transformed into a low-noise, preferably noise-free, state by extrapolating the decoherence time and deriving a transformation rule and applying this to the simulation results of the qubits.

The possibility of artificially generating decoherence is to be explained in detail here. A gate-based quantum evolution is created by successive applications of identical Trotter steps, each representing a small time evolution over the simulation time $d\tau$.

Such digitized time evolution can also be modified to effectively reproduce the decay or dephasing of chosen qubits. This allows the noise extrapolation to be performed much more rigorously.

An example of creating artificial decay in the trotterized time evolution is described below. Each Trotter step is divided into four steps:

(i) application-time evolution operation $U_{QC}(dt)$, i.e. the original Trotter step,
(ii) carrying out an excitation exchange between a bath qubit and an auxiliary qubit associated therewith with a probability p<<1,
(iii) measuring the auxiliary qubit,
(iv) if the auxiliary qubit was in the excited state, it is restored to its ground state. Then iteration takes place from step (i).

It can be shown that with each measurement process, the density matrix $\hat{D}$ of the simulated system changes $$\hat{D} \to \hat{D} c \mathcal{L}[\hat{D}],$$

it being possible for the Lindblad superoperator, or dissipator, to be introduced as follows.

$$\mathcal{L}[\hat{D}] \equiv p \left( \sigma^+ \hat{D} \sigma^- - \frac{1}{2} \sigma^- \sigma^+ \hat{D} - \frac{1}{2} \hat{D} \sigma^- \sigma^+ \right)$$

Here $\sigma^{+(-)}$ is a spin-drop/increase operator which corresponds to the excitation creation/annihilation operator. The repeated execution of similar entanglement operations and measurements then generates an artificial decay at the rate $\gamma=p/dt$.

This rate can then be controlled by the permutation probability p. This in turn allows noise extrapolation related only to decay as described above.

Other effects besides decay can be achieved by any rotation of the original dissipator operator. In particular, the choice $\varphi=\pi$ simulates the noise that leads to the excitation of the qubit. Similarly, a bath having a finite temperature can also be achieved if a statistical distribution is used for rotating the dissipator operator.

Intrinsic dephasing can also be generated artificially. One way to do this is to use the above procedure, but with the dissipator operator σz. Another approach is to state that dephasing corresponds to fluctuations in qubit frequencies, and that the fluctuations in a qubit frequency in turn correspond to σωσz-type terms in the Hamiltonian. Therefore, in order to increase the magnitude of the dephasing alone, artificial fluctuations of the corresponding Hamilton terms can therefore also be inserted into each Trotter step, with corresponding statistics. In particular, this method would allow the reproduction of arbitrary time correlations of the noise.

The last possibility of error correction discussed here is controlling the temperature in order to produce a specific heat distribution within the quantum computer by at least one auxiliary qubit being put into an excited state so that thermal energy is absorbed.

This is necessary because the qubit dephasing can cause the system to heat up. If the heating is undesirable, it can be mitigated by introducing a thermostat between the simulation and the physical space, as will be discussed later.

As already mentioned above, the time evolution of a quantum system under the action of the Hamiltonian His to be simulated. Then the effects of inherent noise can be used to bring the system into a quasi-steady state. To achieve a specific heat distribution, an additional thermostat can be added to the Hamiltonian, for example $$H \to H+H_{thermo}$$

A specific example of $H_{thermo}$ is a Hamiltonian that acts on the simulation space in such a way that the number of excitations is maintained. Maintaining the number of excitations is necessary when an electronic structure problem is to be simulated because the number of excitations corresponds to the number of electrons and the number of electrons is fixed. The Hamiltonian connects the simulation space with an operation outside the simulation space, i.e. with an auxiliary qubit. The operation on the auxiliary qubit must be able to put the qubit from the ground state into an excited state. If the auxiliary qubit has an intrinsic decay rate and is at zero temperature, then the auxiliary qubit will absorb energy at and around the energy gap ΔE between the ground state and the excited state. A Hamiltonian of this kind could be, for example, $$H_{thermo} \propto \sigma_z^{sim} \sigma_x^{aux}$$

where $$\sigma_z^{sim}$$

acts on the simulation space and $$\sigma_x^{aux}$$

acts on the auxiliary qubit.

The invention described above is explained in more detail below with reference to an embodiment.

In the drawings

Figure 1:
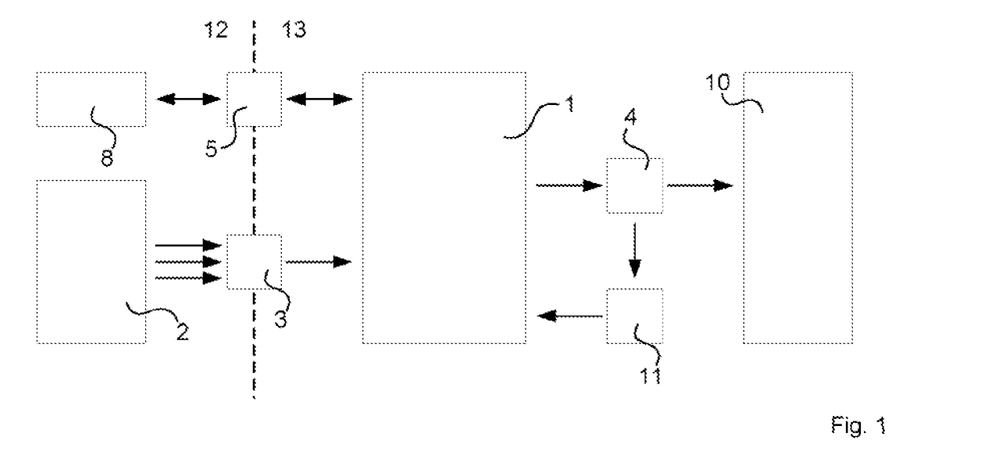
FIG. 1 is a schematic representation of the quantum simulation with all error correction methods according to the invention.

FIG. 1 is a schematic representation of a simulation 1 of a quantum mechanical system, for example a chemical structure, having three different error correction methods which are used to complement one another.

The central region in the middle visualizes the simulation 1 in the overall method within a logical space 13. The method works best for quantum simulation algorithms aiming for a steady state of the system. A noise source in a physical space injects noise 2 into the simulation 1 from the outside. An interface between physical qubits and logical qubits of the simulation space introduces a rotation angle φ between the two spaces and affects the noise seen by quantum simulation. An optimal angle φ minimizes the effect of noise. In the simulation, noise-induced heating can be reduced by adding Hamiltonians that introduce temperature control 5. Before the final low-noise simulation results 10 can be obtained, an extrapolation 4 is carried out, in which the simulation is performed multiple times, each time with different external noises and, if necessary, with additional artificial noises 11 in order to resolve contributions from different error sources more precisely.

Figure 2:
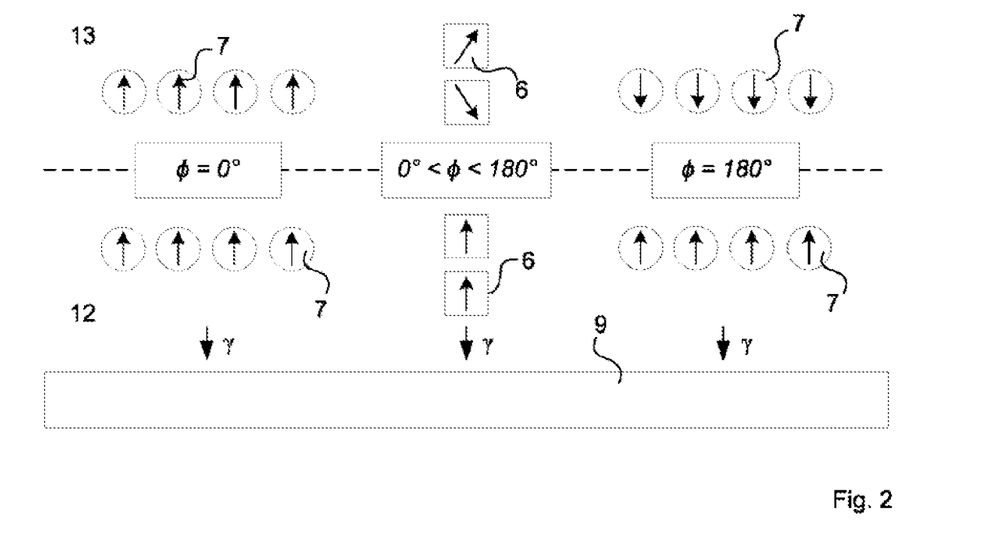
FIG. 2 is a schematic representation of an optimal mapping of logical qubits onto physical qubits at a suitable rotation angle.

FIG. 2 shows an example of optimal angles in a cluster-bath quantum simulation in the presence of an intrinsic decay. Qubit decay drives the physical qubits toward their ground states. By introducing an angle φ=π between the right-hand physical and logical bath qubits 7, the corresponding electronic states are driven toward full filling. In the absence of cluster qubit decay, this mechanism drives the cluster-bath simulation to a solution that corresponds to the bath spectral densities $$S^-_{p \in cluster}(\omega) = \sum_{i \in empty\,bath} t_i^2 \frac{\gamma_i/2}{(\gamma_i/2)^2 + (\omega - \omega_i)^2}$$

$$S^+_{p \in cluster}(\omega) = \sum_{i \in filled\,bath} t_i^2 \frac{\gamma_i/2}{(\gamma_i/2)^2 + (\omega + \omega_i)^2}.$$

In the presence of cluster qubit decay, the cluster qubit angles leading to partial filling are advantageous.

Figure 3:
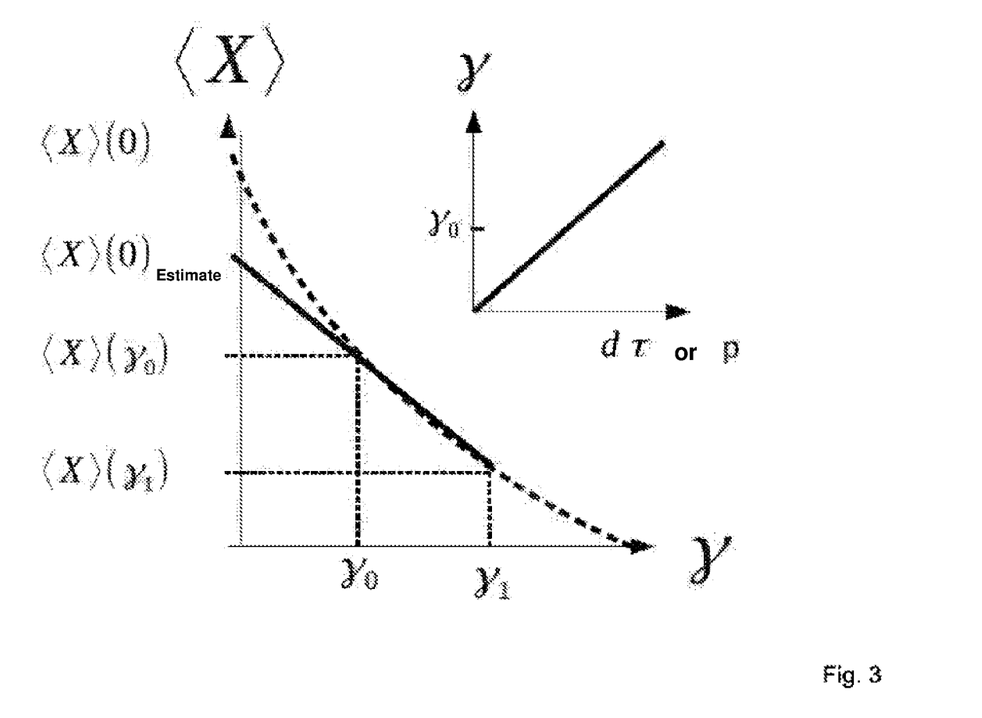
FIG. 3 is a representation of a linear noise extrapolation in a graph with $\langle X \rangle$ over $\gamma$ and an auxiliary graph with $\gamma$ over dτ.

Finally, FIG. 3 shows a linear noise extrapolation of the expected value $\langle X \rangle$. The noise-free result $\langle X \rangle(0)$ can be estimated by measuring the expected values under noise, $\langle X \rangle(\gamma>0)$. The linear estimation comprises measurements under two noise levels, $\gamma_0$ and $\gamma_1$. Noise 2 can be increased, for example, by increasing the Trotter step time dτ or by increasing the probability of artificial decay ρ. The linear estimate can be improved with more measurements and non-linear extrapolation.

A method for simulating a quantum mechanical system is thus described above, which method uses the advantages of quantum mechanics for the simulation, but at the same time reduces the error susceptibility of these systems.

LIST OF REFERENCE SIGNS

1 Simulation
2 Noise
3 Mapping
4 Extrapolation
5 Temperature control
6 Cluster qubits
7 Bath qubits
8 Auxiliary qubits
9 Environment
10 Simulation results
11 Artificial noise
12 Physical space
13 Logical space

The invention claimed is:

1. A method for simulating a quantum mechanical system using a quantum computer which has a plurality of qubits, the method comprising:
   mapping logical states of the qubits onto physical states of the qubits and simulating onto the qubits a quantum mechanical model of the quantum mechanical system to obtain a simulation of the quantum mechanical system;
   evaluating the simulation;
   extracting simulation results by measurements of the quantum computer while evaluating the simulation; and
   using a plurality of methods for error reduction to reduce effects of noise acting on the quantum computer;
   wherein the quantum mechanical system is divided into a cluster and a bath, the qubits first being evaluated with regard to the system properties thereof and being categorized into high-performance qubits and low-performance qubits and, within the context of a mapping process, an association of the high-performance qubits for simulating the cluster and an association of the low-performance qubits for simulating the bath being carried out.

2. The method according to claim 1, wherein the logical states of the qubits are each mapped onto the physical states of the qubits for arbitrary rotation angles φ using a transformation operator $$U(\varphi) = \exp(-i\varphi\sigma_y/2) = I \cdot \cos(\varphi/2) - i\sigma_y \sin(\varphi/2),$$

where I is the identity matrix and σy is a Pauli matrix in a space spanned by the states $$|0\rangle \equiv (1,0) \text{ und } |1\rangle \equiv (0,1).$$

3. The method according to claim 2, further comprising selecting the rotation angle o for each qubit such that the qubit decays into a state corresponding to a physical system state of the simulated quantum mechanical system.

4. The method according to claim 1, wherein within the context of mapping the quantum mechanical system onto the qubits of the quantum computer, the mapping is chosen such that each qubit corresponds to a physical single-particle state of the quantum mechanical system.

5. The method according to claim 4, wherein the mapping of the quantum mechanical system onto the qubits of the quantum computer is chosen such that each qubit continues to correspond to a physical single-particle state of the quantum mechanical system after a decay.

6. The method according to claim 1, wherein the simulation of the quantum mechanical system extrapolating the simulation results into a noise-free environment.

7. The method according to claim 6, wherein artificial noise of different levels is iteratively generated in the quantum computer in order to extrapolate a noise-free state and decoherence times of the qubits are measured on the basis of the artificial noise in each case, a linear relationship between the artificial noise and the decoherence times being determined and a transformation rule for transforming simulation results into the noise-free environment being derived therefrom and finally the simulation results being transformed using the derived transformation rule.

8. The method according to claim 7, wherein an extrapolation takes place by first a Trotter step being iteratively carried out, after which an excitation exchange is carried out between a bath qubit and an auxiliary qubit with a probability p<<1, the auxiliary qubit is measured and, if the auxiliary qubit was measured in an excited state of the auxiliary qubit, the auxiliary qubit is reset to a ground state of the auxiliary qubit and finally the Trotter step is started again, the decoherence times of the qubit being changed due to the measurements, and finally the simulation results being transformed into the noise-free state by extrapolating the decoherence time and deriving the transformation rule, and applying the transformation rule to the simulation results of the qubit.

9. The method according to claim 1, further comprising carrying out a temperature control for producing a specific distribution function within the quantum computer by putting at least one auxiliary qubit into an excited state so that thermal energy is absorbed.

* * * * *